United States Patent
Hayashi et al.

(10) Patent No.: US 9,541,209 B2
(45) Date of Patent: Jan. 10, 2017

(54) STRUCTURE OF CHECK VALVE

(71) Applicant: SANKEI GIKEN CO., LTD., Kawaguchi-shi, Saitama (JP)

(72) Inventors: Kaneyoshi Hayashi, Kawaguchi (JP); Shigeyoshi Hayashi, Kawaguchi (JP)

(73) Assignee: SANKEI GIKEN CO., LTD., Saitama (JP)

( * ) Notice: Subject to any disclaimer, the term of this patent is extended or adjusted under 35 U.S.C. 154(b) by 33 days.

(21) Appl. No.: 14/516,940

(22) Filed: Oct. 17, 2014

(65) Prior Publication Data

US 2015/0300518 A1 Oct. 22, 2015

(30) Foreign Application Priority Data

Apr. 21, 2014 (JP) ................................. 2014-087065
Jun. 25, 2014 (JP) ................................. 2014-130818

(51) Int. Cl.
*F16K 27/02* (2006.01)
*F16K 15/06* (2006.01)

(52) U.S. Cl.
CPC ......... *F16K 27/0209* (2013.01); *F16K 15/063* (2013.01)

(58) Field of Classification Search
CPC ............................ F16K 27/0209; F16K 27/063
USPC .................................................... 137/543.15
See application file for complete search history.

(56) References Cited

U.S. PATENT DOCUMENTS

| 5,556,679 | A | * | 9/1996 | Booles | F16L 39/005 138/104 |
|---|---|---|---|---|---|
| 2002/0092568 | A1 | * | 7/2002 | Sims | F16K 15/063 137/543.15 |
| 2007/0044848 | A1 | * | 3/2007 | Norman | F16K 15/063 137/542 |
| 2008/0067466 | A1 | | 3/2008 | Kobayashi et al. | |
| 2011/0036408 | A1 | * | 2/2011 | Desai | F16K 15/063 137/1 |
| 2013/0092261 | A1 | * | 4/2013 | Andersson | F16K 15/06 137/511 |
| 2014/0060672 | A1 | | 3/2014 | Gomola | |

FOREIGN PATENT DOCUMENTS

| CN | 103542139 A | 1/2014 |
|---|---|---|
| CN | 103574111 A | 2/2014 |
| CN | 103697199 A | 4/2014 |
| JP | 2005-36889 | 2/2005 |
| JP | 2007-100814 | 4/2007 |
| JP | 2008-68812 | 3/2008 |
| JP | 2008-240741 | 10/2008 |
| JP | 2011-153684 | 8/2011 |

* cited by examiner

*Primary Examiner* — Mary McManmon
*Assistant Examiner* — Patrick Williams
(74) *Attorney, Agent, or Firm* — Norris McLaughlin & Marcus, P.A.

(57) ABSTRACT

Provided is an attachment structure of a check valve that is easily attached to piping, and does not need time and effort of manufacturing. A valve casing having a collar part is attached so as to be sandwiched between a pair of flanges joined to each other through an annular seal body in an upstream side in a fluid flow direction. In this valve casing, a valve is biased in a seating direction to a valve seat through a shaft and a biasing means.

8 Claims, 13 Drawing Sheets

STRUCTURE OF CHECK VALVE

BACKGROUND OF THE INVENTION

Field of the Invention

The present invention relates to a structure of a check valve that can prevent water hammer and mechanical vibration.

Description of the Related Art

A check valve is, for example, arranged at a downstream side etc. of a pump, and is opened by a pump pressure to flow a fluid to the downstream side. In addition, when the pump stops, the check valve blocks a flow path by a biasing force of a spring provided at the valve.

As one example, a check valve of Japanese Patent Laid-Open No. 2005-36889 has been proposed.

Such check valve includes: a valve; a shaft support member that also functions as a valve seat; and a valve box that is fitted thereonto, and has a structure of preventing water hammer by quick spring movement. Namely, a built-in spring pushes down the valve vertically to the flow path, and thereby the flow path is quickly blocked.

This structure of the check valve, as shown in FIG. 13, has the valve box formed of a casting formed in a cylindrical shape, and the valve and the shaft support member that are arranged therein, and prevents water hammer at the time of valve closing as much as possible. However, the cylindrical valve box formed of the casting has heavy weight, and is structurally expensive.

In addition, the shaft support member of the valve is screw-fastened to both openings of the valve box. Therefore, there were disadvantages in which manufacturing processes, such as grooving of a screwing part, increased, the number of components also increased, and too much cost was required. Furthermore, the valve and the shaft support member must be screw-fastened when attached to the valve box, which is accompanied by troublesomeness.

Consequently, the present invention aims at providing a structure of a check valve that is simple and readily attachable to overcome these disadvantages with lower manufacturing cost.

SUMMARY OF THE INVENTION

A first aspect of the present invention is a structure of a check valve including:

a valve casing (1) that has a collar part (3) at an outer periphery of one end of a cylindrical part (2), and has a valve seat (4) at an other end opening of the cylindrical part (2);

a shaft support part (5) that has an insertion part (6) for a shaft (10) at a center, and in which a coupling part (7) is formed that extends outwardly in a radial direction from the insertion part (6), and in which an end of the coupling part (7) is connected to an inner periphery of the valve casing (1);

the shaft (10) whose one end is inserted and secured to the insertion part (6) of the shaft support part (5), and whose other end is projected;

a valve (15) in which the shaft (10) is inserted in a center hole in a liquid-tight manner, and that is removably seated on the valve seat (4); and a biasing means (12) that biases the valve (15) in a seating direction, in which the collar part (3) of the valve casing (1) is attached so as to be sandwiched between an arbitrary pair of flanges that are joined by facing each other through an annular seal body.

A second aspect of the present invention is the structure of the check valve of the first aspect of the present invention, in which a thickness of the collar part (3) is formed thick, and in which a bypass path (9) is provided that openably communicates an inlet/outlet port (9a) provided at an inner periphery of the cylindrical part (2) at which the collar part (3) is located with an inlet/outlet port (9b) provided at a flat surface of the collar part (3).

A third aspect of the present invention is the structure of the check valve of the second aspect of the present invention, in which in the collar part (3), formed is a plug insertion hole (8) having the inlet/outlet port (9a) that penetrates in a radial direction from an outer periphery of the collar part (3), and is opened to an inside of the cylindrical part (2), the bypass path (9) is formed by providing the inlet/outlet port (9b) communicated with the inlet/outlet port (9a) in an L-shaped manner at a root of the plug insertion hole (8) and an outer periphery of the cylindrical part (2), and in which a bypass plug (41) is inserted inside the plug insertion hole (8), and the bypass path (9) is opened and closed by the bypass plug (41).

A fourth aspect of the present invention is a structure of a check valve including:

a valve casing (1) that has a collar part (3) at an outer periphery of one end of a cylindrical part (2), and has a valve seat (4) at an other end opening of the cylindrical part (2);

a shaft support part (5) that has an insertion part (6) for a shaft (10) at a center, and in which a coupling part (7) is formed that extends outwardly in a radial direction from the insertion part (6), and in which an end of the coupling part (7) is connected to an inner periphery of the valve casing (1);

the shaft (10) whose one end is inserted and secured to the insertion part (6) of the shaft support part (5), and whose other end is projected;

a valve (15) in which the shaft (10) is inserted in a center hole in a liquid-tight manner, and that is removably seated on the valve seat (4); and a biasing means (12) that biases the valve (15) in a seating direction, in which the valve (15) of the check valve is arranged inside a flexible pipe body (30) having metal flanges (33) and (33) at both ends, and the collar part (3) of the check valve is attached so as to be sandwiched between the flange (33) and a flange (34) of piping (35) facing the flange (33) through an annular seal body (36).

A fifth aspect of the present invention is the structure of the check valve of the fourth aspect of the present invention, in which an outer diameter of the cylindrical part (2) of the valve casing (1) is formed smaller than an inner diameter of an end of an insertion side of the flexible pipe body (30), and wherein when the collar part (3) of the valve casing (1) is arranged between the flanges (33) and (34), an annular passage (42) is formed between the cylindrical part (2) and the flexible pipe body (30), and wherein a thickness of the collar part (3) is formed thick, and wherein a bypass path (9) is provided that openably communicates an inlet/outlet port (9a) provided at an inner periphery of the cylindrical part (2) at which the collar part (3) is located with an inlet/outlet port (9b) provided at a flat surface of the collar part (3), and wherein the bypass path (9) and the annular passage (42) are communicated each other.

A sixth aspect of the present invention is the structure of the check valve of the fifth aspect of the present, in which in the collar part (3), formed is a plug insertion hole (8) having the inlet/outlet port (9a) that penetrates in a radial direction from an outer periphery of the collar part (3), and is opened to an inside of the cylindrical part (2), the bypass path (9) is formed by providing the inlet/outlet port (9b) communicated with the inlet/outlet port (9a) in an L-shaped manner at a root of the plug insertion hole (8) and the outer periphery of the cylindrical part (2), and in which a bypass plug (41) is screwed to an inside of the plug insertion hole (8), and the bypass path (9) is opened and closed.

A seventh aspect of the present invention is the structure of the check valve of any of the fourth to sixth aspects of the present invention, in which the insertion part (6) of the shaft support part (5) and the coupling part (7) are integrally molded in the valve casing (1).

An eighth aspect of the present invention is the structure of the check valve of any of the fourth to sixth aspects of the present invention, in which the valve (15) has a valve body (15a) and a sandwiching body (15c), a cylinder part having the center hole is integrally formed at the valve body (15a), a valve seat contact member (18) is arranged at the valve body (15a), and the valve seat contact member (18) is pressed by the sandwiching body (15c), and in which a locking ring (15e) is provided adjacent to the sandwiching body (15c), and the valve seat contact member (18) and the sandwiching body (15c) are secured by the locking ring (15e) to configure the valve (15).

A ninth aspect of the present invention is the structure of the check valve of any of the fourth to sixth aspects of the present invention, in which the flexible pipe body (30) has a small flange (30a2) in which an annular ring (30a1) has been integrally buried at both ends in an axis line direction of the flexible pipe body (30), and the metal flange (33) is arranged at an outer periphery of the each small flange (30a2), and in which the collar part (3) of the valve casing (1) of the check valve comes into contact with the small flange (30a2), and is sandwiched between the metal flange (33) and the flange (34) of the piping (35) facing the metal flange (33).

A tenth aspect of the present invention is the structure of the check valve of any of the fourth to sixth aspects of the present invention, in which the flexible pipe body (30) is formed of fluororesin, the flexible pipe body (30) has a small flange (30b1) at the both ends in the axis line direction of the flexible pipe body (30), and the metal flange (33) is arranged at an outer periphery of the small flange (30b1), and in which the collar part (3) of the valve casing (1) is brought into contact with the small flange (30b1), and the collar part (3) is attached so as to be sandwiched between the metal flange (33) and the flange (34) of the piping (35) facing the metal flange (33) through the seal body (36).

An eleventh aspect of the present invention is the structure of the check valve of any of the fourth to sixth aspects of the present invention, in which the flexible pipe body (30) is formed of stainless steel, the flexible pipe body (30) has an annular groove-shaped, i.e., annular U-shaped, ring (30c1) at the both ends in the axis line direction of the flexible pipe body (30), and the metal flange (33) is arranged at an outer periphery of the groove-shaped ring (30c1), and in which the collar part (3) of the valve casing (1) comes into contact with the groove-shaped ring (30c1) through an annular seal body (37), and the collar part (3) is attached so as to be sandwiched between the metal flange (33) and the flange (34) of the piping (35) facing the metal flange (33) through the seal body (36).

The first aspect of the present invention is the structure of the check valve in which the collar part 3 of an outer flange shape of the valve casing 1 is attached so as to be sandwiched between an arbitrary pair of flanges that are joined by facing each other through an annular seal body. Therefore, the valve casing 1 can be extremely easily secured between the pair of flanges facing each other, and attachment and removal of the valve casing 1 become easy, thus obtaining the structure of the check valve with good maintainability.

In the above-described configuration, the thickness of the collar part 3 is formed thick, and a bypass path 9 is provided that openably communicates the inlet/outlet port 9a provided at the inner periphery of the cylindrical part 2 at which the collar part 3 is located with the inlet/outlet port 9b provided at the flat surface of the collar part 3. As described above, since the openable bypass path 9 is integrally formed at the collar part 3 of the check valve, the bypass path 9 can be easily provided by sandwiching the check valve between the arbitrary pair of flanges.

In the above-described configuration, the plug insertion hole 8 is formed that penetrates through the inner periphery of the cylindrical part 2 from the outer periphery of the collar part 3, the inlet/outlet port 9b is formed at the root of the plug insertion hole 8 and the outer periphery of the cylindrical part 2, the bypass path 9 is formed that communicates them with each other in the L-shaped manner, the bypass plug 41 is inserted inside the plug insertion hole 8, and the bypass path 9 is opened and closed by the bypass plug 41.

According to this structure, a flow path of the bypass path 9 formed at the collar part 3 of the valve casing 1 becomes short. Therefore, can be provided a check valve in which clogging in the bypass path 9 does not easily occur, and that does not require much time and effort for maintenance.

The fourth aspect of the present invention is the structure of the check valve in which the collar part 3 of the outer flange shape of the valve casing 1 is attached so as to be sandwiched between the flange 33 of the flexible pipe body 30 and the flange 34 of the piping 35 facing the flange 33 through an annular seal body. In a case of this structure, a valve casing can be easily attached to even a flexible pipe comparatively difficult for the check valve to be provided. Additionally, the structure is simple, and has good maintainability.

The fifth aspect of the present invention is the structure of the check valve in which the check valve has been applied to the flange 33 of the flexible pipe body 30 and the flange 34 of the piping 35. In this case, since the openable bypass path 9 is integrally formed at the collar part 3 of the check valve, the check valve is sandwiched by the flexible pipe body 30 difficult for a bypass path to be provided, and thereby the bypass path 9 can be easily provided.

In the above-described configuration, when the insertion part 6 and the coupling part 7 of the shaft support part 5 are integrally formed in the valve casing 1, the number of components and manufacturing processes of the check valve can be reduced, and a structure of the check valve with low manufacturing cost is obtained.

In the above-described configuration, when the valve 15 is formed by screw-fastening divided bodies, the valve seat contact member 18 is prevented from being detached from the valve 15 by a hydraulic pressure, and loss of the valve seat contact member 18 can be prevented at the time of disassembly of the check valve. In addition, the valve seat contact member 18 can be mounted at the valve 15 without applying an excessive force.

As in the ninth to eleventh aspects of the present invention, the flexible pipe body 30 is a flexible pipe body with a small flange or a groove-shaped ring in place of the small flange arranged at both ends thereof, and the body made of rubber, fluororesin, or stainless-steel is suitably utilized.

When the flexible pipe body 30 is configured with fluororesin, it can be easily manufactured by injection molding etc., and is superior also in corrosion resistance, thus obtaining a check valve having good maintainability and cost performance. In addition, when the flexible pipe body 30 is configured with stainless steel, the check valve having a long life and good maintainability is obtained.

DESCRIPTION OF THE EMBODIMENTS

Next, an embodiment of the present invention will be explained based on drawings.

Working Example 1

Figure 1:
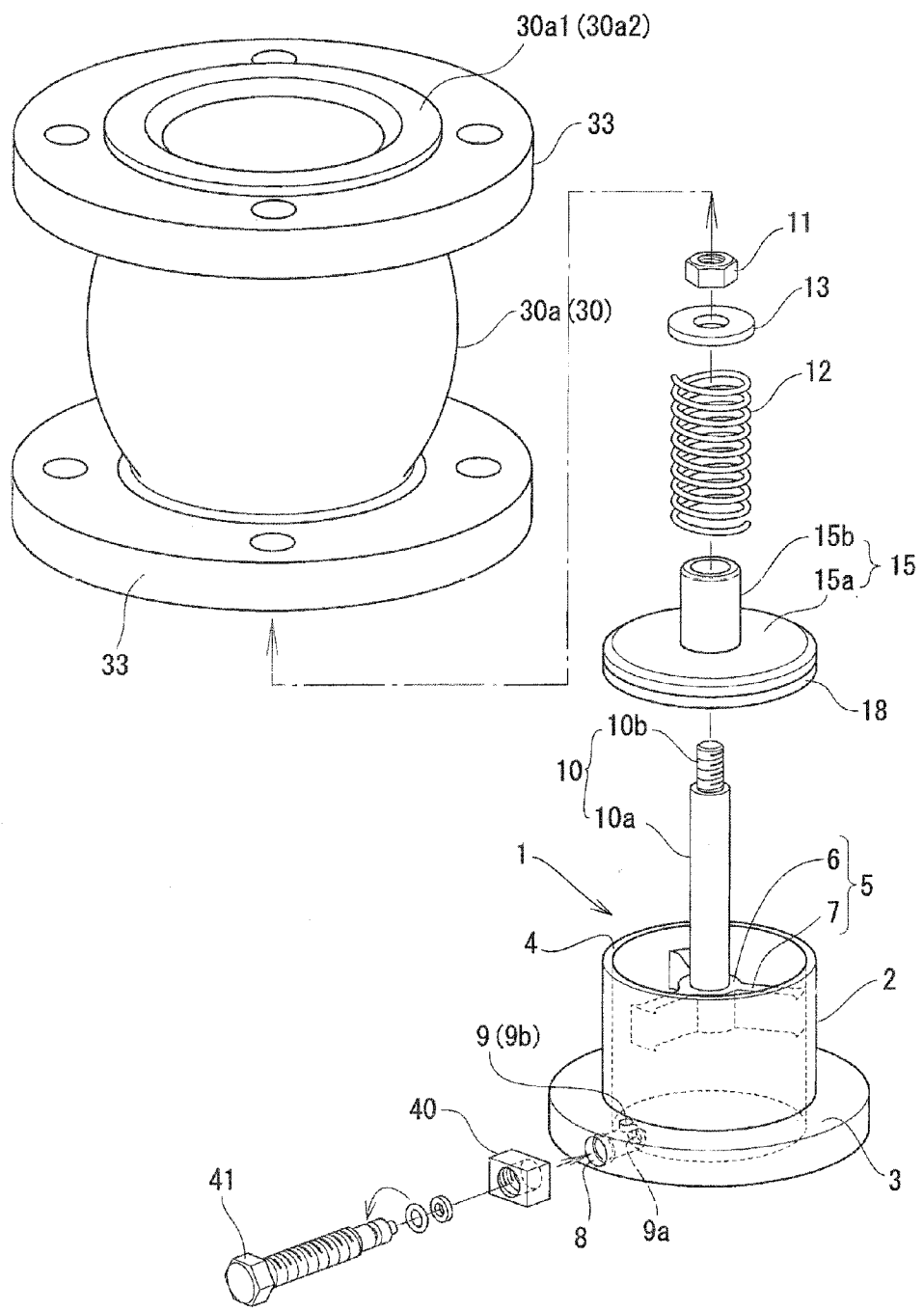
FIG. 1 is an exploded perspective view showing a first working example of a check valve used for the present invention.
Figure 2:
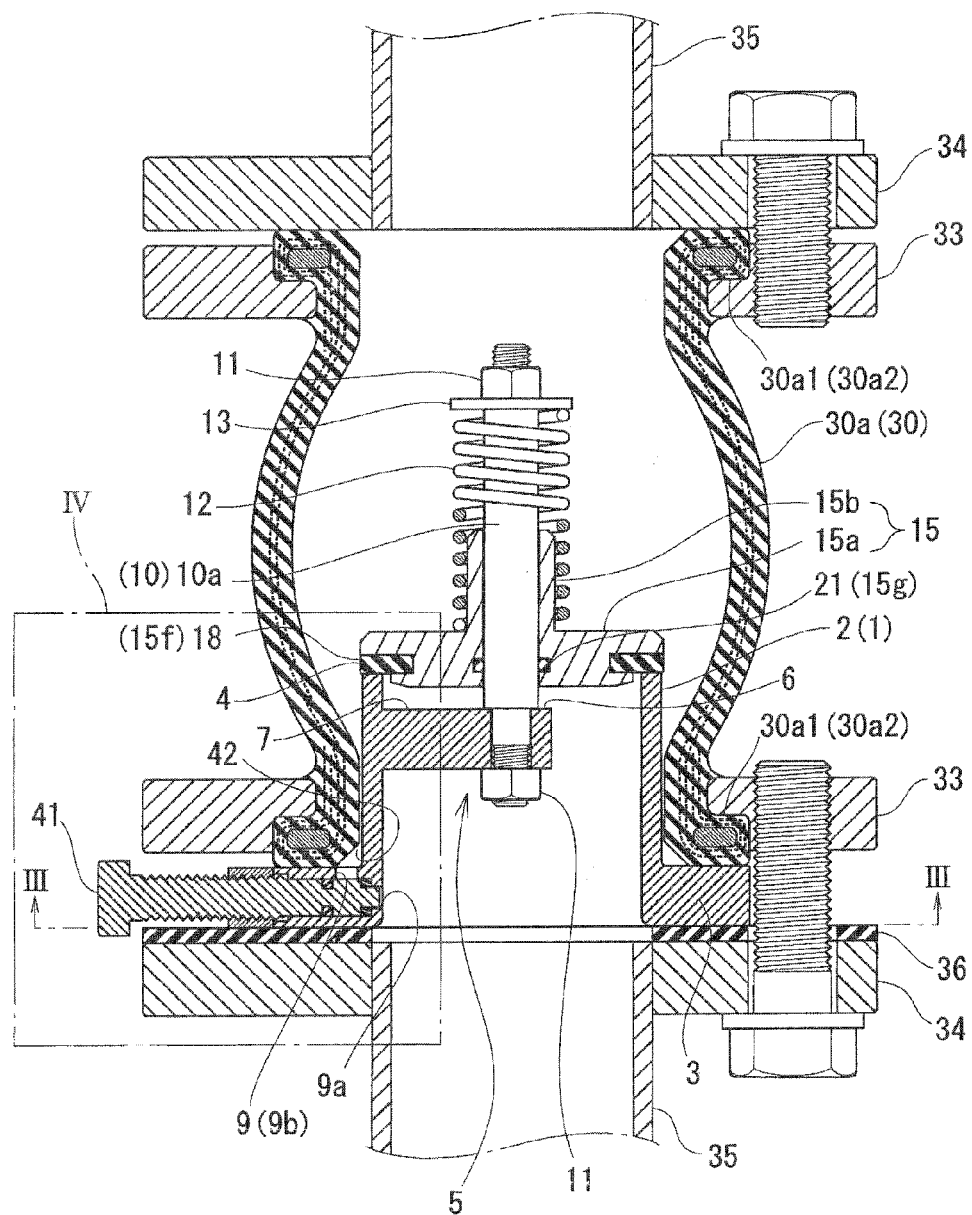
FIG. 2 is a longitudinal cross-sectional view showing a state where the check valve used for the present invention has been sandwiched between flanges 33 and 34, and has been inserted into a flexible pipe body 30, and it is an arrow cross-sectional view of FIG. 3 taken along a line II-II.

FIG. 1 is an exploded perspective view of a check valve of the present invention, and FIG. 2 is a longitudinal cross-sectional view after the check valve is attached to piping.

(Structure of Valve Casing)

This check valve has: a valve casing 1 at which a shaft support part 5 has been integrally provided; and a shaft 10, and a biasing means 12 and a valve 15 are provided at the valve casing 1.

This invention has a feature particularly in a structure of the valve casing 1 of the check valve.

As shown in FIG. 1, in the valve casing 1, a collar part 3 of an outer flange shape is integrally provided at an outer periphery of one end of a cylindrical part 2 whose transverse cross section is a circle. In addition, a valve seat 4 is provided at an end surface of an other end opening of the cylindrical part 2. Furthermore, the shaft support part 5 is integrally formed at an inner periphery of the cylindrical part 2.

An outer diameter of the cylindrical part 2 is, as shown in FIG. 2, formed smaller than an inner diameter of an end of a flexible pipe body 30 fitted onto the check valve, and a slight gap that forms a passage 42 is formed between the cylindrical part 2 and the flexible pipe body 30.

Figure 3:
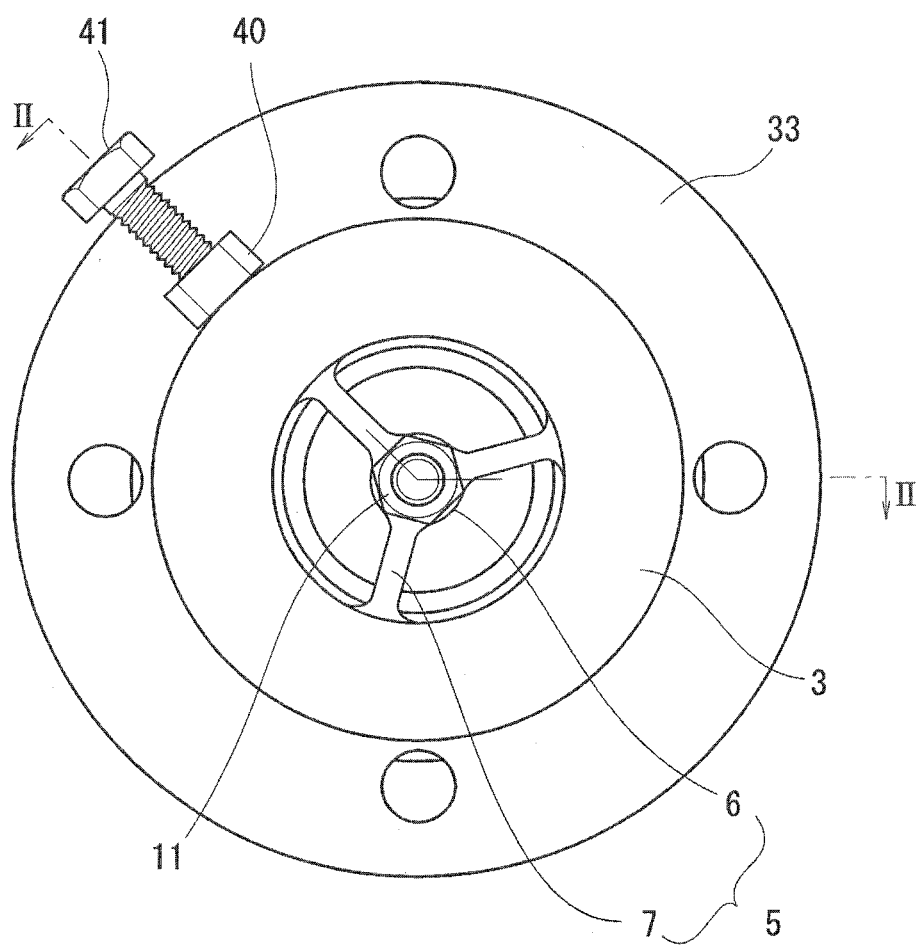
FIG. 3 is an arrow view taken along a line III-III of FIG. 2.
Figure 10:
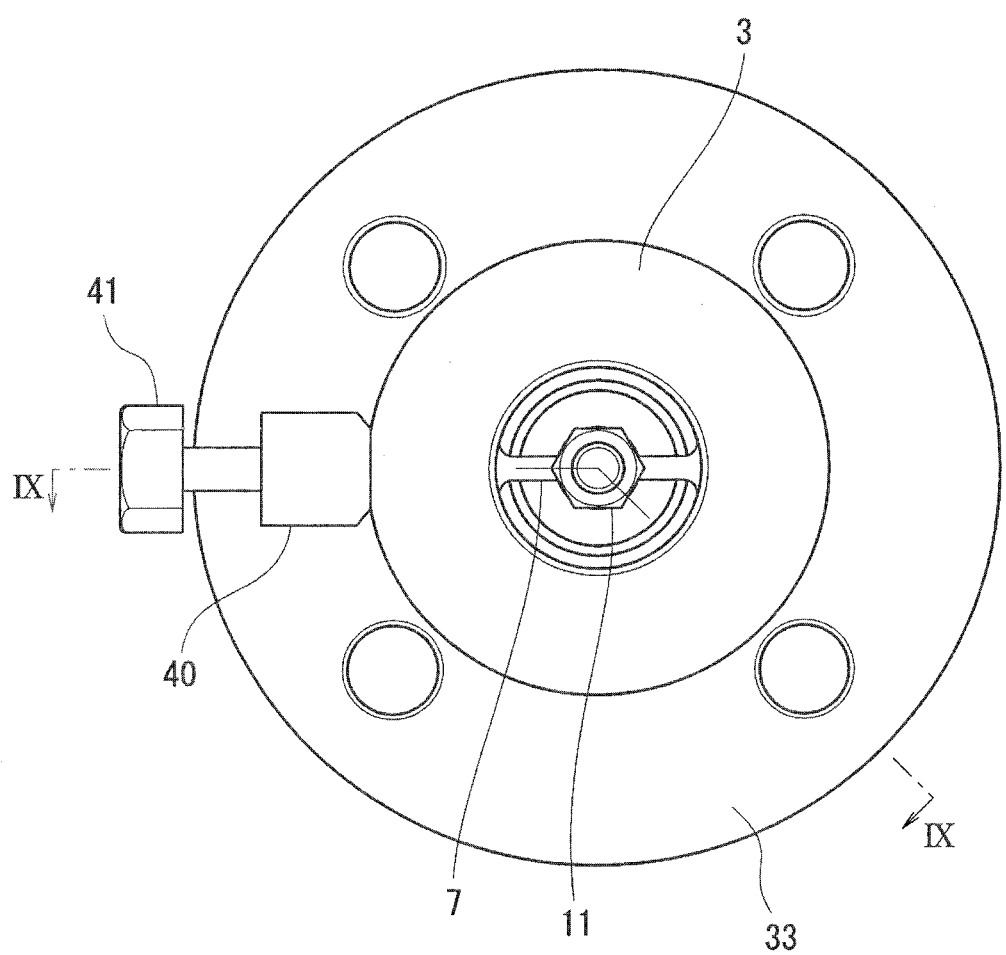
FIG. 10 is an arrow view taken along a line X-X of FIG. 9.

In the shaft support part 5, an insertion part 6 in which the shaft 10 is inserted is provided at a center in a penetrating manner, and the insertion part 6 and the inner periphery of the cylindrical part 2 of the valve casing 1 are integrally connected to each other through three coupling parts 7 in this example (refer to FIGS. 1 and 3). The coupling parts 7 are provided separated from one another in a peripheral direction outward in a radial direction from the insertion part 6. In this example, although the three coupling parts 7 are provided, the number of coupling parts 7 is not limited to this. For example, the number of coupling parts 7 can also be reduced to two as in FIG. 10.

(Structure of Bypass Path Provided at Collar Part)

Next, a bypass path 9 integrally provided at the valve casing 1 will be explained.

A thickness of the collar part 3 is formed thick, and a flat surface portion thereof is formed flat. In the collar part 3, a plug insertion hole 8 is formed in a radial direction from an outer periphery of the collar part 3, and an end of the plug insertion hole 8 is opened to the inner periphery of the cylindrical part 2 to serve as one inlet/outlet port 9a. In addition, an other inlet/outlet port 9b is opened that is communicated with the passage 42 at a flat surface of the collar part (3) and at a root of the plug insertion hole 8 and the cylindrical part 2. Additionally, those inlet/outlet ports 9a and 9b are communicated with each other in an L-shaped manner to form the bypass path 9 (refer to FIGS. 1, 4, 8, etc.).

Furthermore, a bypass plug locking part 40 in which an inner screw has been threaded is provided in the plug insertion hole 8. A bypass plug 41 is screwed there. The bypass path 9 is opened and closed by movement in an axis line direction of this bypass plug 41. Although only one bypass path 9 and bypass plug 41 are provided in this example, a plurality of bypass paths 9 and bypass plugs 41 may be provided separated from each other in the peripheral direction.

It is to be noted that although the cylindrical part 2 and the collar part 3 of the valve casing 1 are desirably integrally manufactured, it is also possible to manufacture them as separate bodies, join them by welding etc. at the time of assembly, and to thereby form the valve casing 1.

(Structures of Valve, Biasing Means, and Shaft)

In the present application, the biasing means 12 of the valve 15 will be explained as a coil spring (hereinafter, described as a spring 12 for convenience of explanation).

In the valve 15, integrally formed are a disc-shaped valve body 15*a* and a cylinder part 15*b* formed in a cylindrical shape at a center thereof. As shown in FIG. 2, a center hole in which the shaft 10 is inserted is made to penetrate at an inner periphery of the cylinder part 15*b*. An axial center of the center hole and an axial center of the insertion part 6 of the valve casing 1 are matched with each other.

An annular groove 15*f* is provided at an outer periphery of the valve body 15*a*, an annular rubber valve seat contact member 18 is fitted onto the groove 15*f*, and a lower surface of the valve seat contact member 18 is removably brought into contact with the valve seat 4 of the valve casing 1.

Furthermore, an O-ring groove 15*g* is formed at the inner periphery of the cylinder part 15*b* of the valve body 15*a*, and an O-ring 21 for sealing is mounted there. The outer periphery of the valve body 15*a* is matched with the valve seat 4 of the valve casing 1.

The shaft 10 has a shaft part 10*a* formed in an elongate round bar shape, and a screw part 10*b* of an outer screw is formed at both ends in a longitudinal direction of the shaft 10. The valve 15 is formed so as to be able to slide in an axial direction of the shaft 10.

(Structure of Flexible Pipe Body 30)

Next, a structure of the flexible pipe body 30 serving as a valve box of the present working example will be explained.

The flexible pipe body 30 is formed of a rubber flexible pipe body 30*a* in which a tire cord and a wire have been buried. The wire etc. suppress this flexible pipe body 30*a* from abnormally deforming in the radial direction.

A center portion of this flexible pipe body 30*a* is, as one example, formed in a drum shape, an annular ring 30*a*1 is buried at both ends in an axial direction of the flexible pipe body 30*a*, and a flexible small flange 30*a*2 is formed. This flexible pipe body 30*a* is not limited to the drum shape, but can be changed to a shape, such as a bellows shape and a gourd shape.

As shown in FIG. 2, a metal flange 33 connected to piping is fitted onto outer peripheries of the pair of small flanges 30*a*2, respectively. A concave portion matched with the outer periphery of the small flange 30*a*2 is provided at an inner periphery of the flange 33. In this flange 33, a number of bolt holes are perforated at an outermost side in the radial direction at regular intervals.

(Assembly Procedure of Check Valve)

An assembly procedure of the check valve used for the present invention will be explained.

As one example, first, as shown in FIGS. 1 and 2, a nut 11 is screwed to one end of the shaft 10, and the shaft 10 is inserted in the insertion part 6 of the shaft support part 5 from the collar part 3 side. Next, the valve 15 is inserted from an other end of the shaft 10. In so doing, previously, the O-ring 21 is mounted at an inner periphery of the valve 15, and the valve seat contact member 18 is fitted onto an outer periphery of the valve 15.

Next, the spring 12 that biases the valve 15 is inserted from the other end of the shaft 10. An inner diameter of the spring 12 is larger than an outer diameter of the cylinder part 15*b* of the valve 15. One end in a longitudinal direction of the spring 12 then comes into contact with the valve body 15*a*, and an other end is screw-secured by the nut 11 through a washer 13. The valve 15 is then biased in a direction in contact with the valve seat 4 of the valve casing 1 by this spring 12.

Furthermore, the bypass plug locking part 40 is attached to the plug insertion hole 8 provided in the collar part 3 of the valve casing 1 by welding. In the bypass plug locking part 40, a hole matched with an inner diameter of the plug insertion hole 8 is perforated, and an inner periphery thereof is threaded. The bypass plug 41 is screwed therein.

(Attachment Method of Check Valve to Flexible Pipe Body 30)

The check valve of the present invention is attached to an upstream side in a water flow direction of the flexible pipe body 30.

In this working example, first, the collar part 3 of the valve casing 1 of the assembled check valve is brought into contact with the small flanges 30*a*2 of the flexible pipe body 30*a*. Next, the collar part 3 is sandwiched between the flange 33 of the flexible pipe body 30*a* and the flange 34 of the piping 35 facing the flange 33 through the annular seal body 36.

In such an attachment structure, as in a conventional manner, the check valve can be attached only by sandwiching the collar part 3 without applying processing to an attachment part of the check valve. Therefore, the attachment structure has an effect to be able to significantly reduce work processes of attachment.

(Action of Bypass Path 9)

Figure 4:
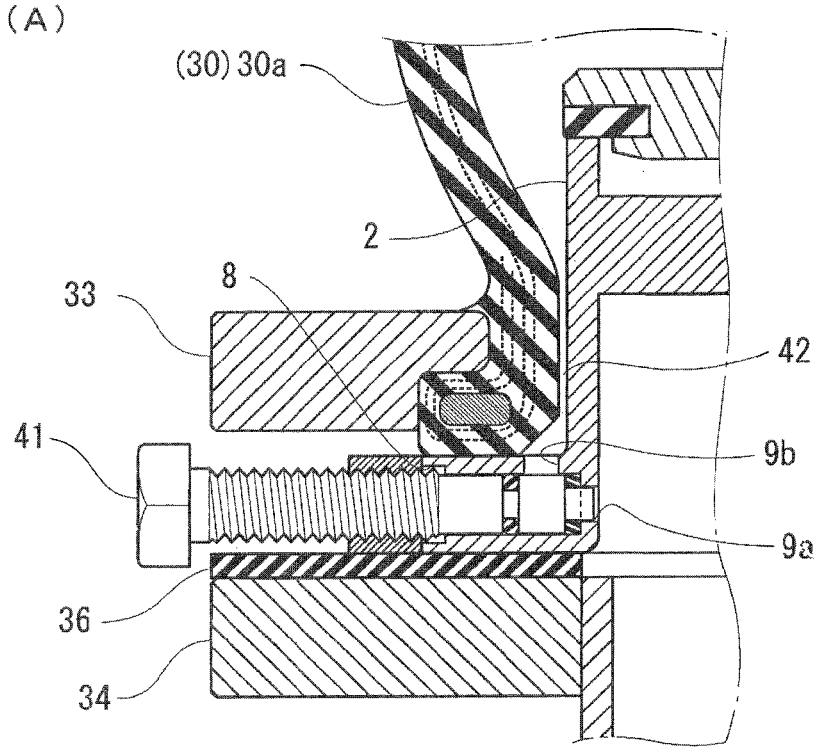
FIGS. 4 (A) and 4 (B) are longitudinal cross-sectional views of a main portion illustrating a bypass structure of the present invention.
Figure 4:
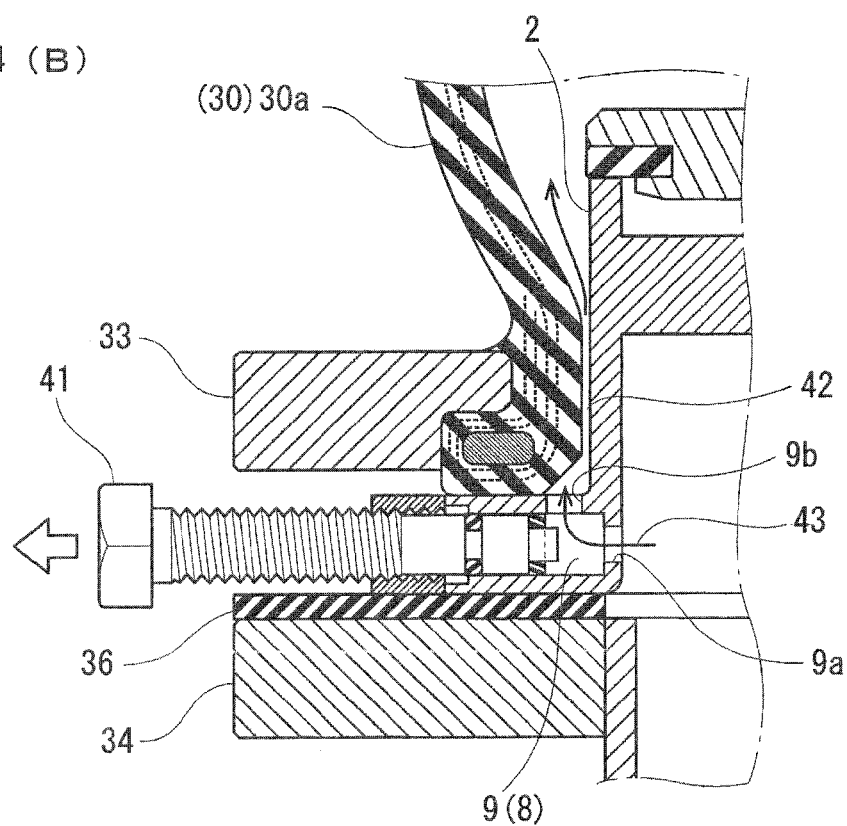

As shown in FIG. 4, an outer diameter of the cylindrical part 2 of the valve casing 1 is formed smaller than an inner diameter of an end of the flexible pipe body 30*a*, and thus when the cylindrical part 2 of the check valve is inserted in one end of the flexible pipe body 30*a*, an annular gap is generated between the outer periphery of the cylindrical part 2 and an inner periphery of the flexible pipe body 30*a*, and the passage 42 is formed there.

The passage 42 and the L-shaped bypass path 9 provided at the above-mentioned collar part 3 are configured to be communicated with each other in a state where the bypass plug 41 is opened (FIG. 4(B)). Normally, the bypass plug 41 is in a closed state (FIG. 4(A)).

As described above, the bypass path 9 is integrally formed at the valve casing 1 of the check valve, and thereby the bypass path 9 can be easily provided at the flexible pipe body 30 structurally difficult to ensure the bypass path 9.

Water is then bypassed between an inside and an upstream side opening end of the rubber flexible pipe body 30*a* through the bypass path 9 and the passage 42. In performing priming before pump drive, and performing drainage in the flexible pipe body 30*a*, as shown in FIG. 4 (B), the bypass plug 41 is made into an opened state, and water is bypassed.

(Action of Check Valve Attached Using the Present Invention)

Figure 5:
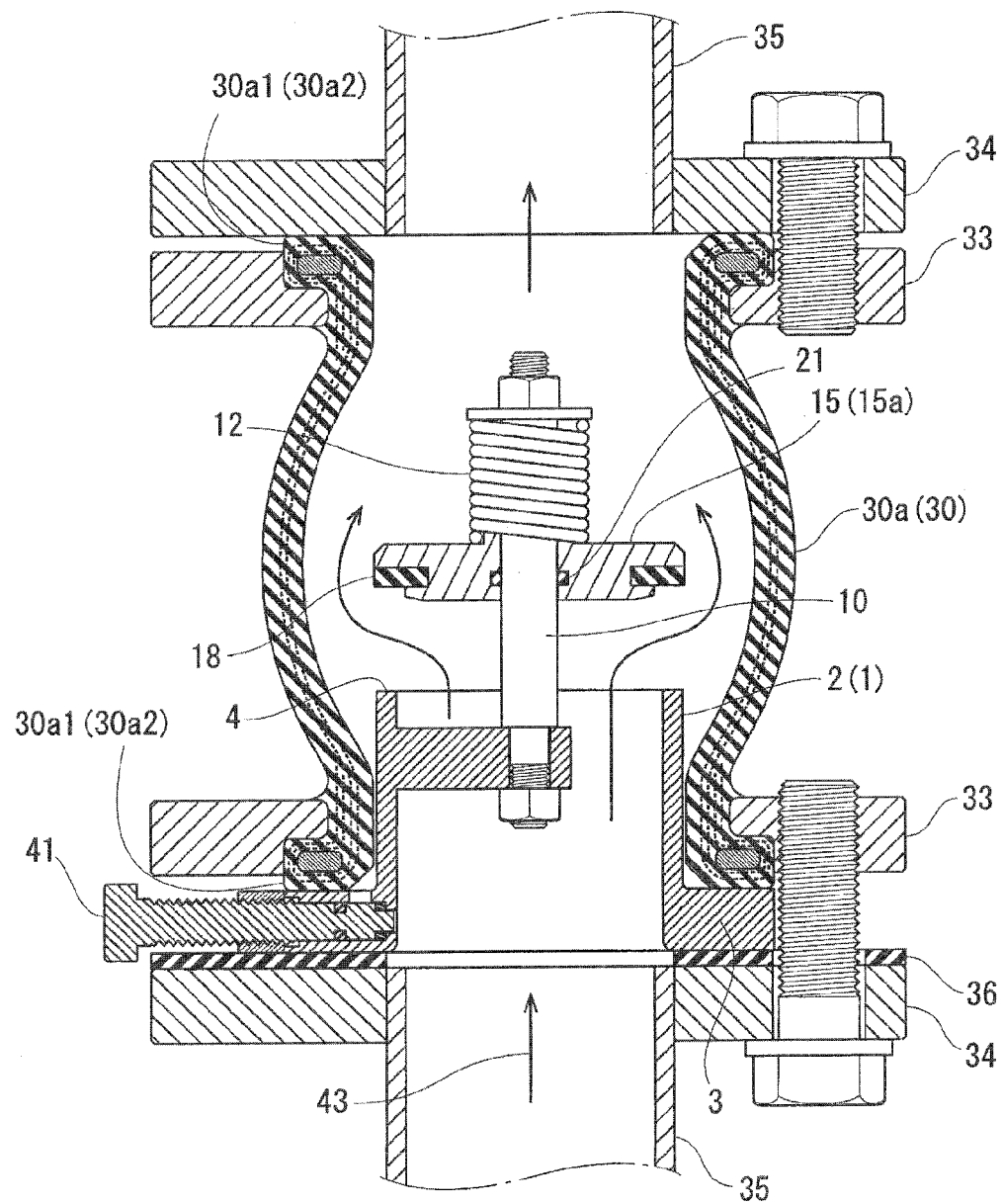
FIG. 5 is a longitudinal cross-sectional view illustrating an action of the present invention.

FIG. 5 illustrates an action of the valve 15.

A pump, which is not shown, is connected to an upstream region or a downstream side of the piping 35.

By a liquid pressure from the pump, the valve 15 is moved to a downstream region side in the axial direction against the spring 12 to open between an opening of the valve seat 4 and the valve 15. A fluid 43 then flows upwardly from a lower part as shown by arrows of FIG. 5 in this example. Next, when the pump stops, the liquid pressure of the pump side decreases, and the spring extends to close the valve 15. At this time, the rubber flexible pipe body 30a extends, and absorbs water hammer.

Further, the rubber flexible pipe body 30a also reliably absorbs a pulsating flow at the time of pump operation, various mechanical vibrations, etc., and improves pressure resistance of the piping. In addition, the rubber flexible pipe body 30a expands/contracts and deforms in the radial direction also due to an earthquake etc., and effectively absorbs the external force.

Working Example 2

Figure 6:
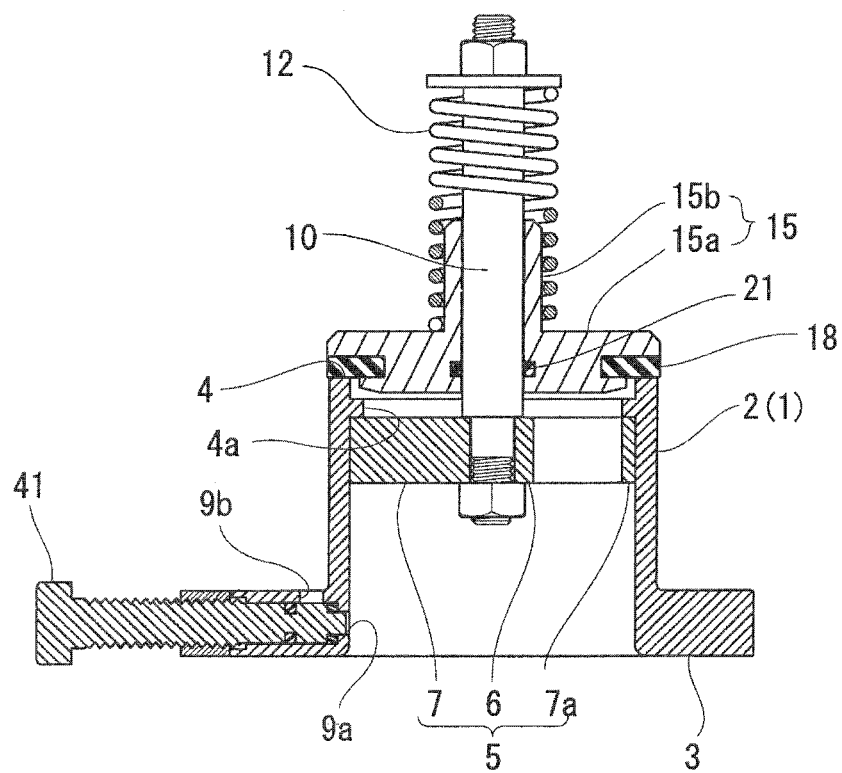
FIG. 6 is a longitudinal cross-sectional view showing a second working example of the check valve used for the present invention.

FIG. 6 shows a second working example of the check valve used for the present invention, and a difference of this example from the check valve of the first working example is only a point where the valve casing 1 and the shaft support part 5 are separate bodies, and where they are locked and connected at a fixing part 4a provided in the valve casing 1.

The collar part 3 of the check valve of this FIG. 6 is also sandwiched between the flange 33 of the flexible pipe body 30a and the flange 34 of the piping 35 through the seal body 36 as in the first working example.

As described in FIG. 6, the annular fixing part 4a is integrally projected inside in the radial direction in an inner periphery of the other end side of the cylindrical part 2 of the valve casing 1. The shaft support part 5 includes: the insertion part 6 of the shaft 10 located at the center thereof, the coupling parts 7, and a locking ring 7a. The insertion part 6 and the locking ring 7a are integrally coupled through the coupling parts 7 arranged separated from one another in the peripheral direction.

An outer periphery of this locking ring 7a is matched with the inner periphery of the cylindrical part 2 of the valve casing 1, one end surface of the locking ring 7a is fixed to the annular fixing part 4a of the valve casing 1, and the valve casing 1 and the shaft support part 5 are connected to each other.

Working Example 3

Figure 7:
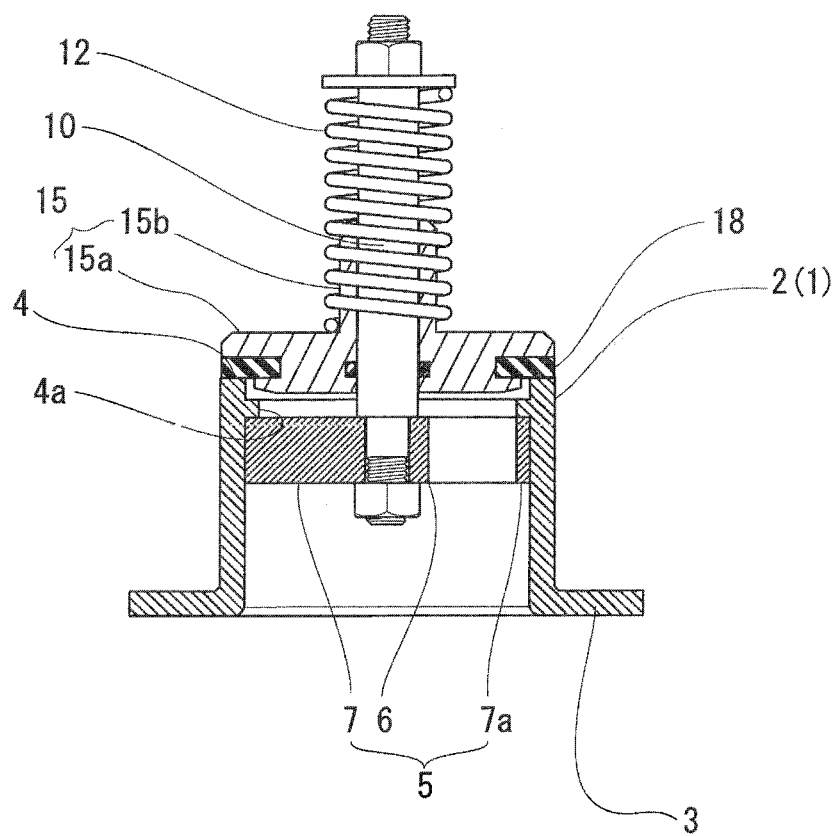
FIG. 7 is a longitudinal cross-sectional view showing a third working example of the check valve used for the present invention.

Although in the first and second working examples of the present invention, the thickness of the collar part 3 is formed thick in order to provide the bypass path 9 at the valve casing 1, it may be formed thin when the bypass path 9 is not provided as shown in FIG. 7.

Working Example 4

A different point of this working example from the working example 1 is that the valve 15 is configured with divided bodies, a seat part 10d is integrally provided in replacement of the washer 13 of the shaft 10, and that a material of the flexible pipe body 30 is changed.

The spring 12 is utilized as the biasing means 12 similarly to the working example 1.

(Structures of Valve and Shaft)

The valve 15 of a fourth working example has the valve body 15a, the sandwiching body 15c, and the valve seat contact member 18.

Figure 8:
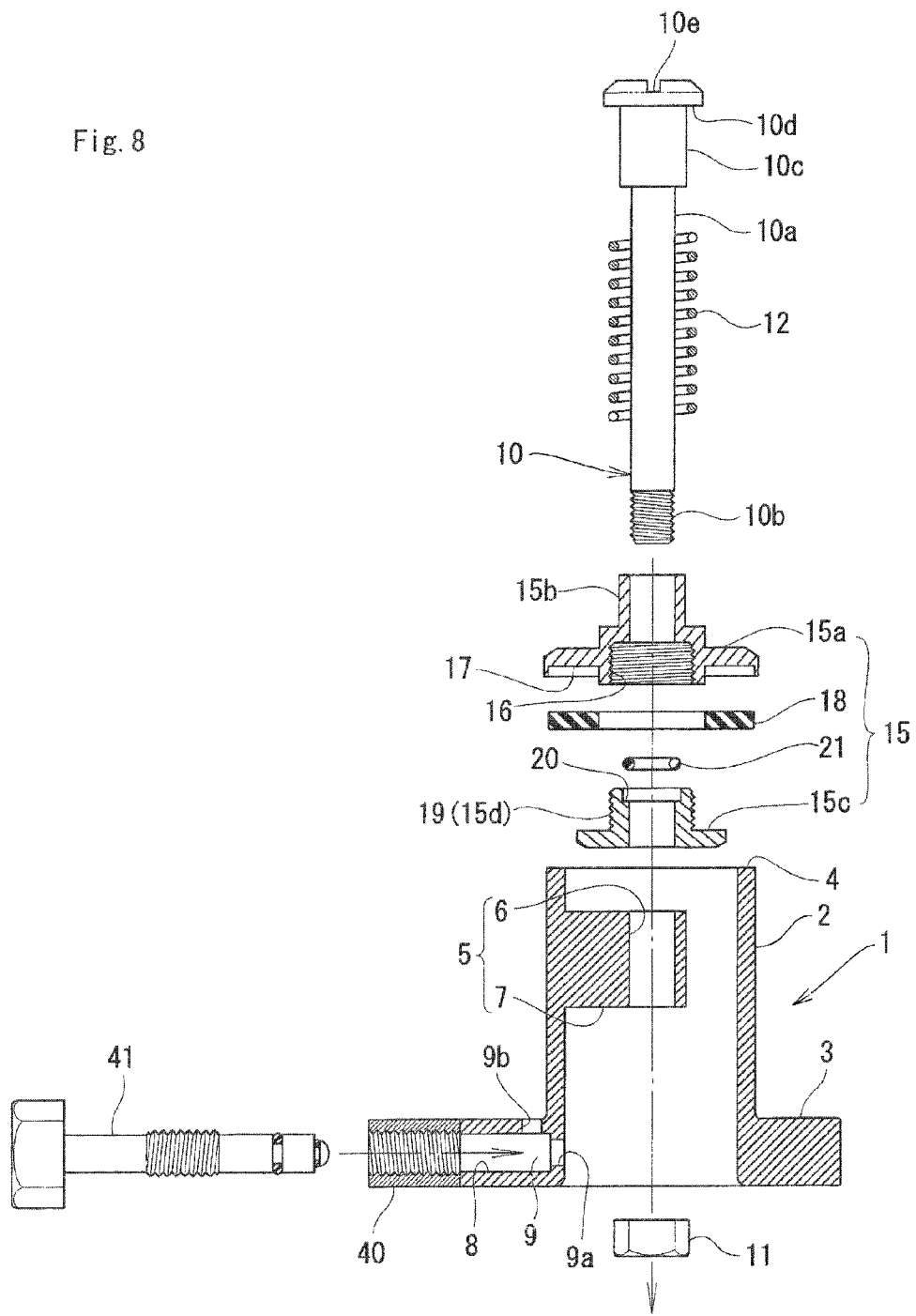
FIG. 8 is an exploded cross-sectional view showing a fourth working example of the check valve used for the present invention.

As shown in FIG. 8, the valve body 15a has the cylinder part 15b formed in a cylindrical shape, a center hole in which the shaft 10 is inserted is made to penetrate through the inner periphery of the cylinder part 15b, and an inner screw 16 is formed at a lower portion in FIG. 8. In addition, an outer periphery of the lower portion is formed in a disc shape, the annular groove 17 is formed at a lower surface side thereof, and an annular rubber valve seat contact member 18 is seated there. Fluororesin, such as polytetrafluoroethylene (PTFE), to which rubber elasticity has been given can be used for the valve seat contact member 18 as one example.

An outer diameter of an upper portion of the cylinder part 15b is matched with the inner diameter of the spring 12.

An inner diameter of the valve seat contact member 18 is matched with the outer diameter of the lower portion of the cylinder part 15b, and an outer diameter thereof is substantially matched with an outer diameter of the valve seat 4 of the valve casing 1.

The sandwiching body 15c has a cylinder part 15d formed in a cylindrical shape, an outer flange is formed at one end of the cylinder part 15d, and a diameter thereof is formed smaller than the outer diameter of the valve seat contact member 18. An outer screw 19 is formed at an outer periphery of the cylinder part 15d. In addition, a hole whose diameter is the same as a diameter of the center hole of the valve body 15a is made to penetrate through an inner periphery of the cylinder part 15d. Furthermore, an annular step part 20 at which the O-ring 21 is arranged is formed at an inner periphery of an other end of the sandwiching body 15c. The sandwiching body 15c is screw-fastened in a state where the valve seat contact member 18 has been arranged at the valve body 15a to thereby configure the valve 15.

In the shaft 10, the shaft part 10a formed in an elongate round bar shape is formed, and a step part 10c matched with the inner diameter of the spring 12 is formed at one end in a longitudinal direction of the shaft portion 10a, and the seat part 10d that bulges outwardly in the radial direction is formed at a tip of the shaft part 10a. A tool fitting part 10e is provided at a top portion of the seat part 10d. Additionally, at an other end, the screw part 10b is formed at an outer periphery of the shaft part 10a.

(Structure of Flexible Pipe Body 30)

Next, a structure of the flexible pipe body 30 will be explained.

The flexible pipe body 30 of this working example is formed of a fluororesin flexible pipe body 30b made by injection formation. This fluororesin flexible pipe body 30b can be manufactured as one example using polytetrafluoroethylene (PTFE), tetrafluoroethylene perfluoroalkyl vinyl ether copolymer (PFA), etc.

Figure 9:
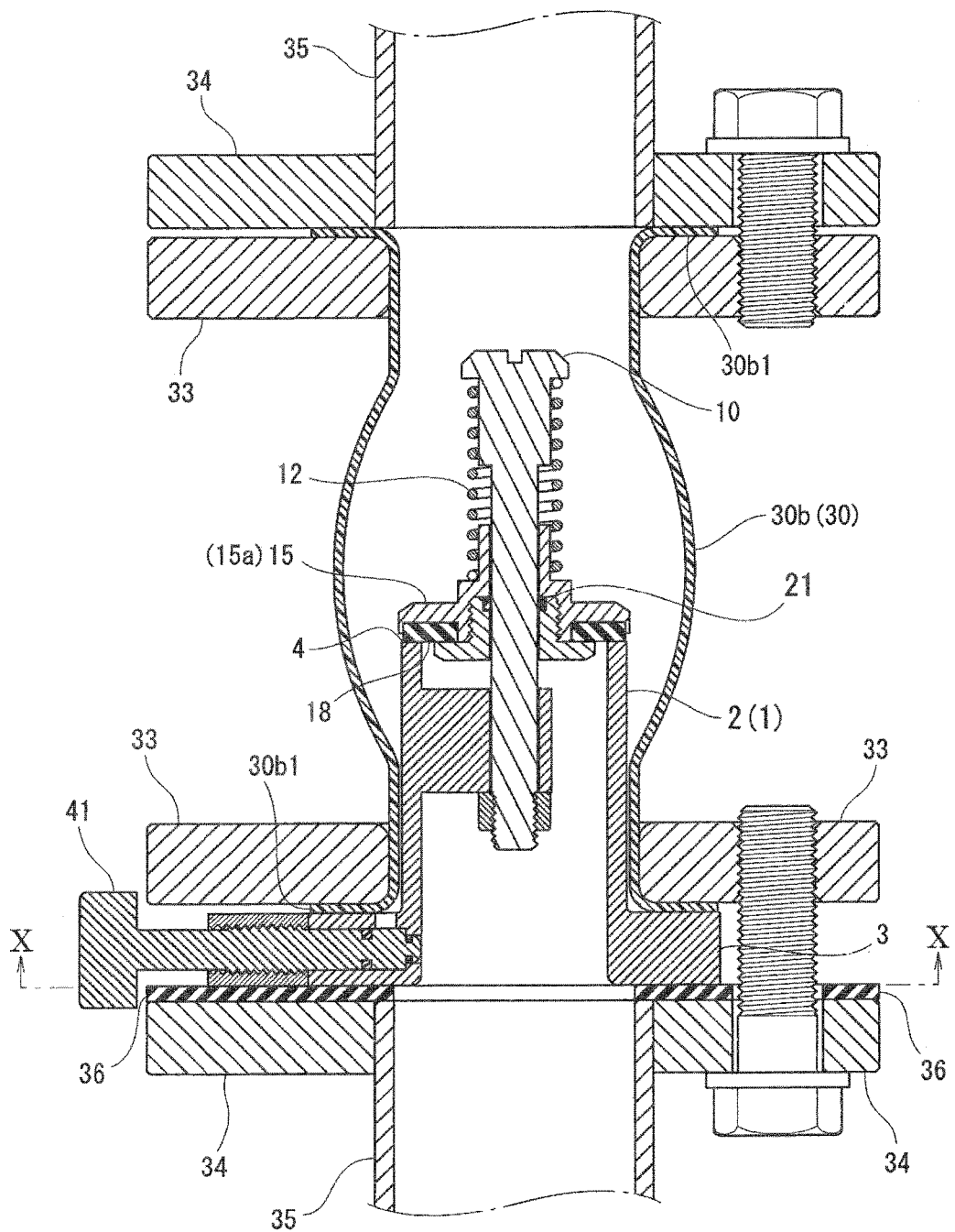
FIG. 9 is a longitudinal cross-sectional view showing a state where the check valve used for the present invention has been inserted into a flexible pipe body 30, and it is an arrow cross-sectional view taken along a line IX-IX of FIG. 10.

The fluororesin flexible pipe body 30b is formed in a cylindrical shape in FIG. 9, a middle portion in the axis line direction thereof is formed in a drum shape bulging outwardly, and the small flange 30b1 is integrally formed at both ends in the axial direction thereof. A shape of the middle portion is not limited to the drum shape, but can be changed to a shape, such as a bellows shape and a gourd shape. The metal flange 33 fitted onto the outer peripheries of the pair of small flanges 30b1 is similar to that of the working example 1.

It is to be noted that as shown in FIG. 9, since fluororesin itself has sealing property, there is no need to interpose a seal body at a portion adjacent to the small flange 30b1 of the flexible pipe body 30b, also fluororesin has a characteristic that dirt is not easily attached, and that thus maintainability becomes better than the rubber flexible pipe body 30a.

(Assembly Procedure of Check Valve)

An assembly procedure of the check valve will be explained.

First, the sandwiching body 15c is screw-fastened in a state where the valve seat contact member 18 has been arranged at the annular groove 17 of the valve body 15a to thereby configure the valve 15. At that time, previously, the O-ring 21 is mounted at the step part 20 of the sandwiching body 15c.

Next, the spring 12 is inserted from a tip of the screw part 10e of the shaft 10, and then, the valve body 15a of the valve 15 is inserted so as to face upwardly in FIG. 1.

Subsequently, the tip of the screw part 10e of the shaft 10 is inserted in the insertion part 6 of the valve casing 1, and the valve casing 1 and the valve 15 are secured by the nut 11. The valve 15 is biased in a direction in contact with the valve seat 4 by the spring 12.

Other procedures are similar to those of the working example 1. In addition, the bypass path 9 and the valve 15 show operation similar to that shown in FIGS. 4 and 5 of the working example 1.

Working Example 5

Figure 11:
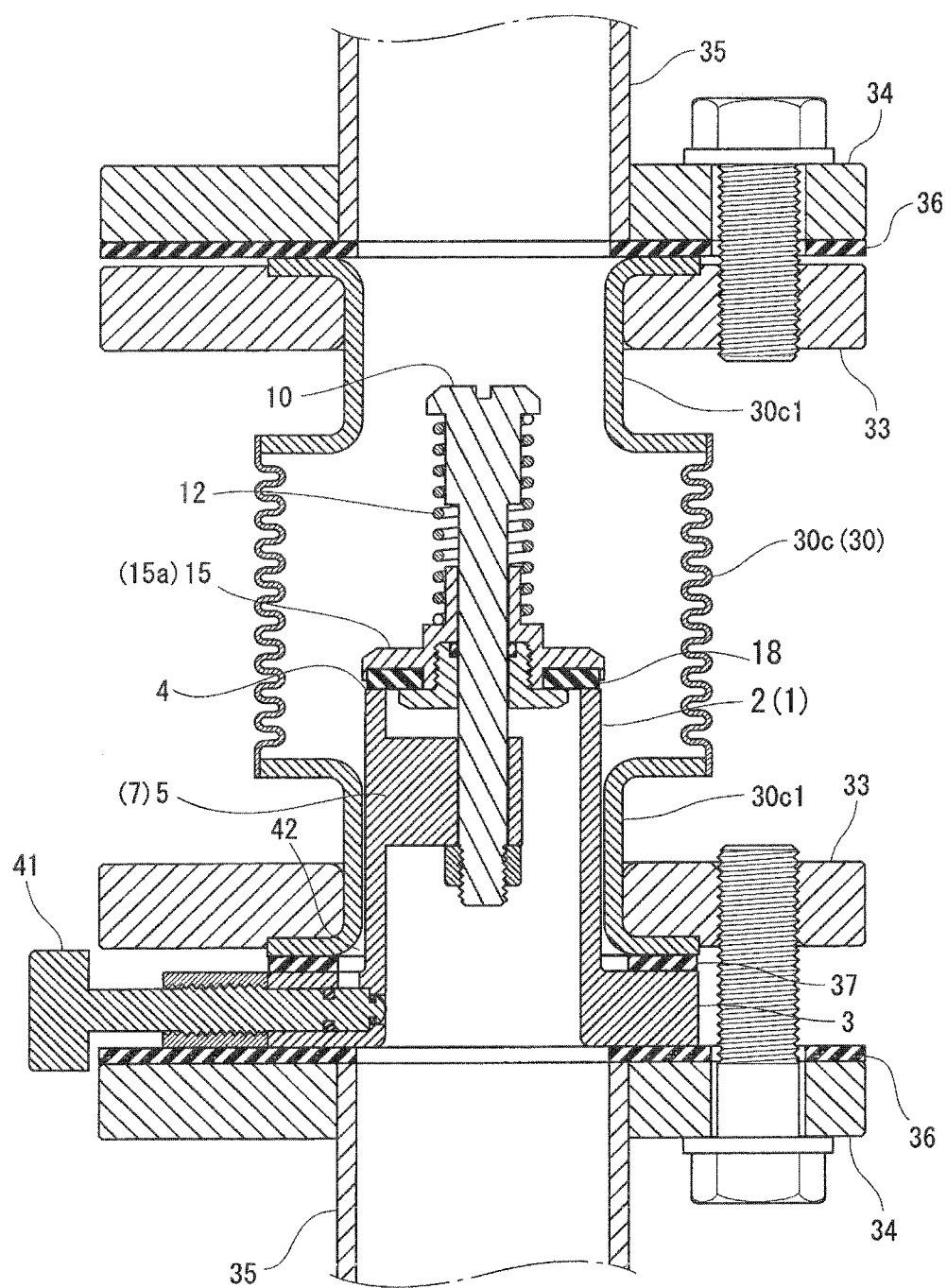
FIG. 11 is a longitudinal cross-sectional view showing a fifth working example of the check valve used for the present invention.

FIG. 11 shows a working example 5 of the check valve used for the present invention, and a difference of this example from the check valve of the working example 4 is that a stainless-steel flexible pipe body 30c is used as the flexible pipe body 30.

Other structures and operational effects are similar to those of the working example 4.

A portion excluding both ends of this stainless-steel pipe is formed in a bellows shape, and configures the stainless-steel flexible pipe body 30c. The both ends are connected to the pair of annular groove-shaped rings 30c1 by welding etc. The flange 33 connected to the piping 35 is fitted onto the groove-shaped rings 30c1, respectively. A concave portion matched with an outer periphery of the groove-shaped ring 30c1 is provided at the inner periphery of the flange 33.

It is to be noted that the flexible pipe body 30c, the groove-shaped ring 30c1, and the flange 33 of this working example are made of stainless steel.

Working Example 6

Other Example of Valve and Shaft Used in the Present Application

Structures of the valve 15 and the shaft 10 used in the present application are not limited to those of the above-described working examples.

Figure 12:
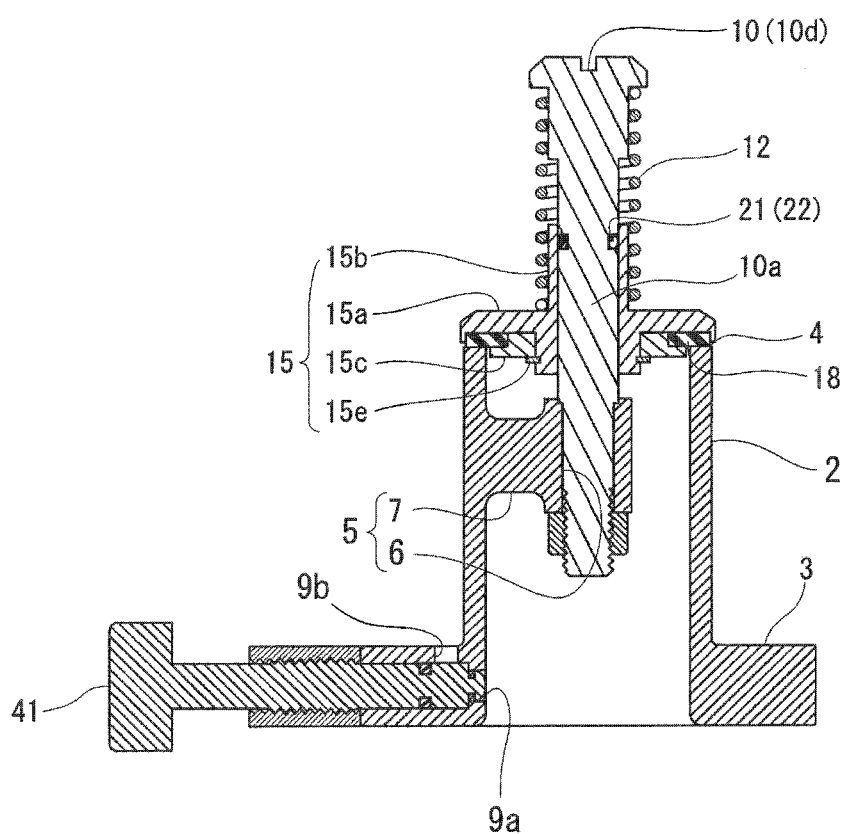
FIG. 12 is a longitudinal cross-sectional view showing an other example of the check valve used for the present invention.
Figure 13:
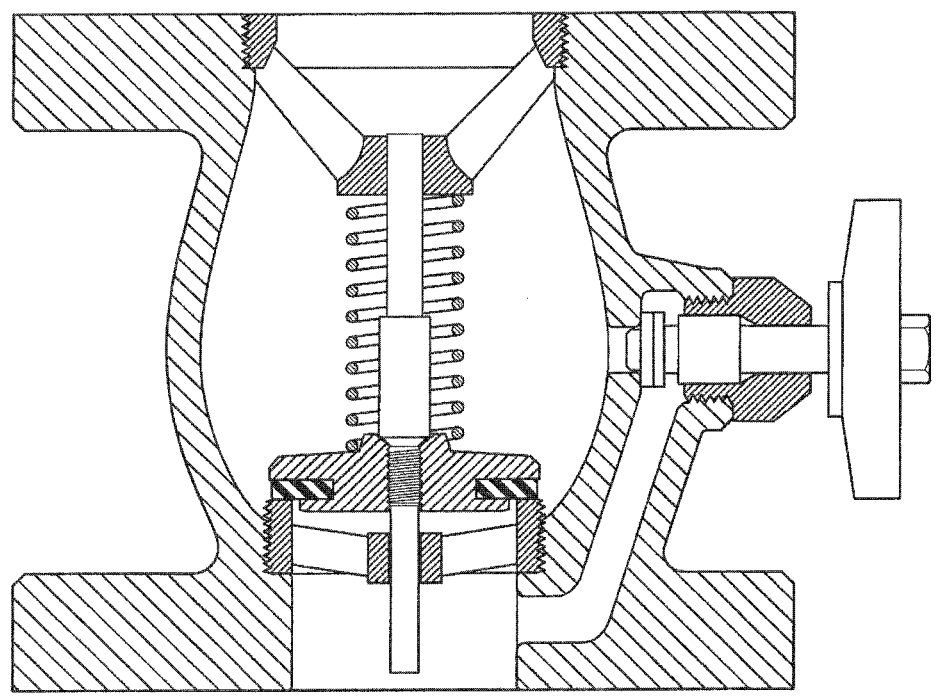
FIG. 13 is a longitudinal cross-sectional view of a conventional type check valve.

For example, as shown in FIG. 12, a cylinder part is provided only at the valve body 15a, the valve seat contact member 18 is arranged at the valve body 15a, and is pressed from a lower part by the sandwiching body 15c in FIG. 12, and they can be secured by a locking ring 15e. In this structure, since the cylinder part of the valve 15 is not divided, and the center hole has no joints, slide contact of the valve 15 and the shaft 10 becomes smooth. In addition, since the structure of the valve 15 becomes simple, manufacturing thereof becomes easy.

In addition, a groove 22 can also be provided at an outer periphery of the shaft part 10a of the shaft 10, and the O-ring 21 can be arranged there. In this case, in a position where the groove 22 is provided at the shaft 10, as shown in FIG. 12, the O-ring 21 is arranged at the shaft part 10a of an inner periphery of the cylinder part of the valve 15 so that the O-ring 21 does not come off even when the valve 15 vertically comes into slide contact with a shaft of the shaft 10.

Other Working Example

In addition, the check valve used for the present invention, although not shown, is not limited to a check valve interposed in a valve box as the flexible pipe body 30 mentioned in the above-described first and second working examples, and a structure may just be employed where the collar part 3 of the check valve is sandwiched between an arbitrary pair of flanges that are joined by facing each other. For example, the check valve used for the present invention may be sandwiched between the piping 35 having the flanges 34 facing each other. In this case, a structure is obtained where an inside of the one piping 35 is equipped with this check valve.

What is claimed is:

1. A check valve comprising:
    a valve casing that has a collar part at an outer periphery of one end of a cylindrical part, and has a valve seat at an other end opening of the cylindrical part;
    a shaft support part that has an insertion part for a shaft at a center, and in which a coupling part is formed that extends outwardly in a radial direction from the insertion part, and in which an end of the coupling part is connected to an inner periphery of the valve casing;
    the shaft whose one end is inserted and secured to the insertion part of the shaft support part, and whose other end is projected;
    a valve in which the shaft is inserted in a center hole in a liquid-tight manner, and that is removably seated on the valve seat; and
    a biasing means that biases the valve in a seating direction, wherein
    the valve of the check valve is arranged inside a flexible rubber pipe body having respective metal flanges at respective ends, and the collar part of the check valve is attached so as to be sandwiched between the flange and a flange of piping facing the flange through an annular seal body;
    and the shaft remains in a fixed position when the valve is opened and closed; and
    wherein
    an outer diameter of the cylindrical part of the valve casing is smaller than an inner diameter of an end of an insertion side of the flexible rubber pipe body,
    and wherein
    the collar part of the valve casing is arranged between the flanges and an annular passage is formed between the cylindrical part and the flexible rubber pipe body,
    and wherein
    the collar part is of sufficient thickness to accommodate a bypass path,
    and wherein
    a bypass path is formed in the collar part and openably communicates with an inlet/outlet port provided at an inner periphery of the cylindrical part at which the collar part is located with an inlet/outlet port provided at a flat surface of the collar part,
    and wherein
    the bypass path and the annular passage communicate with each other.

2. The check valve according to claim 1, wherein
    in the collar part, formed is a plug insertion hole having the inlet/outlet port that penetrates in a radial direction from an outer periphery of the collar part, and is opened to an inside of the cylindrical part,
    the bypass is formed by providing the inlet/outlet port communicating with the inlet/outlet port in an L-shaped manner at a root of the plug insertion hole and an outer periphery of the cylindrical part, and wherein
    a bypass plug is screwed to an inside of the plug insertion hole, and the bypass path is opened and closed.

3. The check valve according to claim 1, wherein the insertion part of the shaft support part, and the coupling part are integrally molded in the valve casing.

4. The check valve according to claim 1, wherein
the valve has a valve body and a sandwiching body, a cylinder part having the center hole is integrally formed at the valve body, a valve seat contact member is arranged at the valve body, and the valve seat contact member is pressed by the sandwiching body, and wherein
a locking ring is provided adjacent to the sandwiching body, and the valve seat contact member and the sandwiching body are secured by the locking ring to configure the valve.

5. The check valve according to claim 1, wherein
the flexible pipe body has at each of its ends a respective small flange in which a respective annular ring has been integrally buried, and the respective metal flanges are arranged at an outer periphery of the respective small flanges, and wherein
the collar part of the valve casing of the check valve comes into contact with the small flange, and is sandwiched between the metal flange and the flange of the piping facing the metal flange.

6. The check valve according to claim 1, wherein
the flexible pipe body is formed of fluororesin,
the flexible pipe body has respective small flanges at the respective ends of the flexible pipe body, one of the small flanges being proximal to the collar part and the other of the small flanges being distal to the collar part, and the metal flange is arranged at an outer periphery of the small flange, and wherein
the collar part of the valve casing is brought into contact with the small flange which is proximal to the collar part, and the collar part is attached so as to be sandwiched between the metal flange and the flange of the piping facing the metal flange through the seal body.

7. A check valve comprising:
a valve casing that has a collar part at an outer periphery of one end of a cylindrical part, and has a valve seat at another end opening of the cylindrical part;
a shaft support part that has an insertion part for a shaft at a center, and in which a coupling part is formed that extends outwardly in a radial direction from the insertion part, and in which an end of the coupling part is connected to an inner periphery of the valve casing;
the shaft whose one end is inserted and secured to the insertion part of the shaft support part, and whose other end is projected;
a valve in which the shaft is inserted in a center hole in a liquid-tight manner and is removably seated on the valve seat; and
a biasing means that biases the valve in a seating direction, wherein
the valve of the check valve is arranged inside a bellows shaped flexible pipe body having a respective having metal flange at each end, and the collar part of the check valve is sandwiched between one of the metal flanges and a flange of piping facing the metal flange through an annular seal body;
and the shaft remains in a fixed position when the valve is opened and closed, wherein
the flexible pipe body is formed of stainless steel,
the flexible pipe body has a respective annular U-shaped ring at each end of the flexible pipe body, one of the annular U-shaped rings being proximal to an annular seal body and the other of the annular U-shaped rings being distal to the annular seal body, and each of the metal flanges is arranged at an outer periphery of the respective annular U-shaped ring, and wherein
the annular seal body is sandwiched between the collar part of the valve casing and the annular U-shaped ring which is proximal to the annular seal body, and the collar part is sandwiched between the metal flange and the flange of the piping facing the metal flange through the seal body
wherein
an annular passage is formed between the cylindrical part and the bellows shaped flexible pipe body,
and wherein
the collar part is of sufficient thickness to accommodate a bypass path, and wherein
a bypass path is formed in the collar part and openably communicates with an inlet/outlet port provided at an inner periphery of the cylindrical part at which the collar part is located with an inlet/outlet port provided at a flat surface of the collar part,
and wherein
the bypass path and the annular passage communicate with each other.

8. A check valve comprising:
a valve casing that has a collar part at an outer periphery of one end of a cylindrical part, and has a valve seat at an other end opening of the cylindrical part;
a shaft support part that has an insertion part for a shaft at a center, and in which a coupling part is formed that extends outwardly in a radial direction from the insertion part, and in which an end of the coupling part is connected to an inner periphery of the valve casing;
the shaft whose one end is inserted and secured to the insertion part of the shaft support part, and whose other end is projected;
a valve in which the shaft is inserted in a center hole in a liquid-tight manner, and that is removably seated on the valve seat; and
a biasing means that biases the valve in a seating direction, wherein
the valve of the check valve is arranged inside a flexible rubber pipe body having respective metal flanges at respective ends, and the collar part of the check valve is attached so as to be sandwiched between the flange and a flange of piping facing the flange through an annular seal body;
and the shaft remains in a fixed position when the valve is opened and closed; and
the flexible pipe body has at each of its ends a respective small flange in which a respective annular ring has been integrally buried, and the respective metal flanges are arranged at an outer periphery of the respective small flanges, and wherein
the collar part of the valve casing of the check valve comes into contact with the small flange, and is sandwiched between the metal flange and the flange of the piping facing the metal flange.

* * * * *